US010021302B2

(12) United States Patent
Liu et al.

(10) Patent No.: US 10,021,302 B2
(45) Date of Patent: Jul. 10, 2018

(54) VIDEO RECORDING METHOD AND DEVICE

(71) Applicant: Nubia Technology Co., Ltd., Shenzhen (CN)

(72) Inventors: Linwen Liu, Shenzhen (CN); Lei Miao, Shenzhen (CN)

(73) Assignee: Nubia Technology Co., Ltd., Shenzhen (CN)

( * ) Notice: Subject to any disclaimer, the term of this patent is extended or adjusted under 35 U.S.C. 154(b) by 0 days.

(21) Appl. No.: 15/322,296

(22) PCT Filed: Jun. 15, 2015

(86) PCT No.: PCT/CN2015/081457
§ 371 (c)(1),
(2) Date: Dec. 27, 2016

(87) PCT Pub. No.: WO2015/196937
PCT Pub. Date: Dec. 30, 2015

(65) Prior Publication Data
US 2017/0134654 A1    May 11, 2017

(30) Foreign Application Priority Data

Jun. 27, 2014  (CN) .......................... 2014 1 0301103

(51) Int. Cl.
*H04N 5/232*     (2006.01)
*H04N 5/77*      (2006.01)
(Continued)

(52) U.S. Cl.
CPC ....... *H04N 5/23245* (2013.01); *G11B 31/006* (2013.01); *H04N 5/23216* (2013.01);
(Continued)

(58) Field of Classification Search
CPC .......... H04N 5/23245; H04N 5/23216; H04N 5/2621; H04N 5/772; H04N 9/7925; H04N 9/802
See application file for complete search history.

(56) References Cited

U.S. PATENT DOCUMENTS 9,807,316 B2 * 10/2017 Jen ...................... H04N 5/272
2008/0136940 A1 * 6/2008 Srikanth ............ H04N 1/00307
348/231.99
(Continued)

FOREIGN PATENT DOCUMENTS

CN        101370097 A    2/2009
CN        102025930 A    4/2011
(Continued)

OTHER PUBLICATIONS

International Search Report of PCT/CN20151081457, dated Sep. 10, 2015.

*Primary Examiner* — Mishawn Hunter
(74) *Attorney, Agent, or Firm* — Banner & Witcoff, Ltd.

(57) ABSTRACT

Disclosed are a video recording method and device. The method includes: based on a video recording start command of a user and an interval preset by the user, the following operations are repetitively performed: capturing image data at intervals and performing an encoding processing on the image data captured at intervals; and based on a video recording end command of the user, using the image data obtained after encoding processing to generate a video file in accordance with a video file format set by the user.

18 Claims, 5 Drawing Sheets

(51) Int. Cl.
*H04N 5/262* (2006.01)
*H04N 9/802* (2006.01)
*H04N 9/79* (2006.01)
*G11B 31/00* (2006.01)

(52) U.S. Cl.
CPC .......... *H04N 5/2621* (2013.01); *H04N 5/772* (2013.01); *H04N 9/7925* (2013.01); *H04N 9/802* (2013.01)

(56) References Cited

U.S. PATENT DOCUMENTS

| | | | |
|---|---|---|---|
| 2009/0249393 A1* | 10/2009 | Shelton | H04N 5/445 |
| | | | 725/39 |
| 2010/0002129 A1* | 1/2010 | Zhou | H04M 1/0264 |
| | | | 348/374 |
| 2012/0155833 A1 | 6/2012 | Narayanan et al. | |
| 2014/0211062 A1* | 7/2014 | Kuo | H04N 5/2258 |
| | | | 348/333.01 |
| 2014/0232905 A1* | 8/2014 | Jung | H04N 5/265 |
| | | | 348/239 |

FOREIGN PATENT DOCUMENTS

| | | |
|---|---|---|
| CN | 103391414 A | 11/2013 |
| CN | 104023192 A | 9/2014 |

\* cited by examiner

VIDEO RECORDING METHOD AND DEVICE

TECHNICAL FIELD

The present document relates the field of data processing, in particular to a video recording method and device.

BACKGROUND

With the development of communication technologies and mobile terminals, various mobile terminals such as mobile phones, smart phones and tablet computers have already been an indispensable part of work and life of people. With the increasing popularization of mobile terminals, the function of recording a video through mobile terminals brings very great convenience to users.

However, the traditional video recording function of the mobile terminal has various restrictions, such as the recording cannot be paused, the sound has no special effect and the image is not interesting. Although a special effect may be achieved through post-production of videos, the professional requirement is high and the real-time performance is not good. At current, mobile terminals have a function of shooting and generating Graphics Interchange Format, GIF, pictures in a preview interface. However, temporary picture files will be generated by adopting the way. Due to the limitation of GIF files, consequently pixel point accuracy will be lost. In view of the limitation of processors of mobile terminals, it is impossible to accept large-size pictures and too many frames.

Therefore, it is necessary to improve the video recording method and device of the related art, such that user can realize video recording at intervals.

SUMMARY

The embodiment of the present document provides a video recording method and device, in order to solve the problem that a mobile terminal cannot record a video at intervals.

The embodiment of the present document provides a video recording method, including the following steps:

based on a video recording start command of a user and an interval preset by the user, repetitively performing following operations: capturing image data at intervals and performing an encoding processing on the image data captured at intervals; and based on a video recording end command of the user, using the image data obtained after encoding processing to generate a video file in accordance with a video file format set by the user.

Alternatively, before performing an encoding processing on the image data captured at intervals, the method further includes: performing a special effect processing on the image data captured at intervals, herein the special effect processing includes one or more of the following contents: basic effect processing, filter effect and special scenario effect.

Alternatively, while capturing image data at intervals and performing an encoding processing on the image data captured at intervals, the method further includes: controlling to turn on an audio device and receive audio data; and performing an encoding processing on the audio data.

Alternatively, before performing the encoding processing on the audio data, the method further includes: performing a special effect processing on the received audio data, herein the special effect processing includes one or more of the following contents: special effect recording, mixing, voice changing, tone changing and speed changing.

Alternatively, a mode of generating the video file includes: based on the video recording end command of the user, using the image data obtained after encoding processing and the audio data obtained after encoding processing to generate the video file in accordance with the video file format set by the user.

Alternatively, the method further includes: providing the user with an operation interface configured to set an interval for video recording.

Alternatively, the image data include camera data, or self-defined bitmaps, or screen data, or textures in an OpenGL drawing system.

Alternatively, the using the image data obtained after encoding processing to generate a video file in accordance with a video file format set by the user includes: using the image data obtained after encoding processing to generate the video file in accordance with the video file format set by the user and a set Presentation Time Stamp, PTS.

The embodiment of the present document further provides a video recording device, including:

an image information acquisition module configured to, based on a video recording start command of a user and an interval preset by the user, capture image data at intervals;

a video encoding module configured to perform an encoding processing on the image data captured by the image information acquisition module at intervals; and a video file generation module configured to, based on a video recording end command of the user, use the image data, which are obtained after the video encoding module performs the encoding processing, to generate a video file in accordance with a video file format set by the user.

Alternatively, the device further includes: a parameter setting module configured to set an interval for video recording.

Alternatively, the parameter setting module is further configured to set a Presentation Time Stamp, PTS, when the video file is generated; and the video file generation module is configured to use the image data obtained after encoding processing to generate the video file in accordance with the video file format set by the parameter setting module and the PTS when the video file is generated.

Alternatively, the image data include camera data, or self-defined bitmaps, or screen data, or textures in an OpenGL drawing system.

Alternatively, the device further includes: an image special effect processing module configured to perform a special effect processing on the image data captured by the image information acquisition module at intervals, herein the special effect processing includes one or more of the following contents: basic effect processing, filter effect and special scenario effect.

Alternatively, the device further includes: an audio acquisition module configured to control to turn on an audio device; and receive audio data; and an audio encoding module configured to perform an encoding processing on the audio data.

Alternatively, the device further includes: an audio special effect processing module configured to perform a special effect processing on the received audio data, herein the special effect processing includes one or more of the following contents: special effect recording, mixing, voice changing, tone changing and speed changing.

The embodiment of the present document further provides a computer-readable storage medium storing program instructions, herein, when being executed, the program instructions can implement the method.

According to the video recording method and device provided by the embodiments of the present document, image data are captured at intervals, and an encoding processing is performed, and then the image data obtained after encoding processing are packed to generate the video file. By the above operations, the function of recording a video at intervals at the mobile terminal is realized. Moreover, a special effect processing is performed on the image data captured at intervals. Audio recording is added and a special effect processing is performed on the audio while recording the video. The PTS is modified while the image data is packed to generate the video file. Therefore, the video recording diversity and entertainment at the mobile device are extended, and the user experience is greatly improved.

SPECIFIC EMBODIMENTS

It needs to be stated that the embodiments of the present document and the features in the embodiments may be mutually and freely combined under the situation of no conflict.

Embodiment 1

Figure 1:
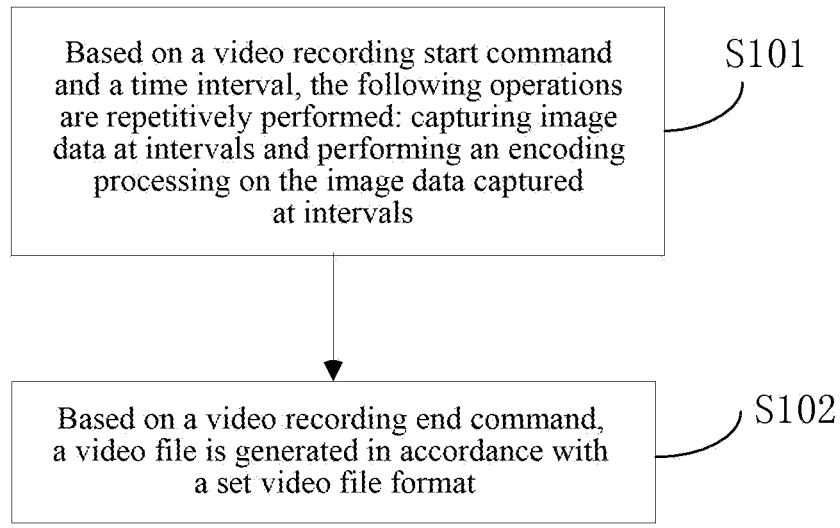
FIG. 1 illustrates a flowchart of a video recording method provided by embodiment 1 of the present document.

Please refer to FIG. 1, which illustrates a video recording method provided by the embodiment of the present document. The procedure of the method includes the following steps.

In step S101, based on a video recording start command of a user and an interval preset by the user, the following operations are repetitively performed: capturing image data at intervals and performing an encoding processing on the image data captured at intervals.

In step S102, based on a video recording end command of the user, by using the image data obtained after encoding processing, a video file is generated in accordance with a video file format set by the user.

The image data may be images shot by a camera and may also be self-defined bitmaps, images on a screen or other images such as textures in an OpenGL drawing system.

In order to improve the interest in shooting of the user, before encoding processing is performed on the image data captured at intervals, the method may further include that:

a special effect processing is performed on the image data captured at intervals, herein the special effect processing includes one or more of the following contents: basic effect processing, filter effect and special scenario effect.

In order to guarantee that the user can record sounds at the same time when a video is recorded, while the image data are captured at intervals and the encoding processing is performed on the image data captured at intervals, the method may further include that:

an audio device is controlled to be turned on and audio data are received; and an encoding processing is performed on the audio data.

The audio data, for example, may be audio data recorded by a microphone when the camera performs a shooting, and may also be self-defined audio files.

Alternatively, before encoding processing is performed on the audio data, the method may further include that: a special effect processing is performed on the received audio data. Herein, the special effect processing includes one or more of the following contents: special effect recording, mixing, voice changing, tone changing and speed changing.

On the basis that the function of recording audio is added, a mode of generating the video file includes that: based on the video recording end command of the user, by using the image data obtained after encoding processing and the audio data obtained after encoding processing, the video file is generated in accordance with the video file format set by the user.

In order to guarantee the convenience and practicability for the operation of the user, an operation interface may also be provided for the user and the operation interface is configured to set an interval for video recording and whether to turn on an audio recording function, etc.

Different from the related art, in the actual application of the embodiment, while the encoding processing is performed on the image data captured at intervals, image data, which are not captured, are not stored to save a storage space of the mobile terminal.

In the video recording method provided by the embodiment, the image data are captured at intervals, and the encoding processing is performed, and then the video file is generated by using the image data obtained after encoding processing. By the above operations, the function of recording a video at intervals of the mobile terminal is realized. The special effect processing is performed on the image data captured at intervals. Audio is recorded and the special effect processing is performed on the audio while the video is recorded. Therefore, the video recording interest and practicability of the mobile terminal are greatly improved.

Embodiment 2

Figure 2:
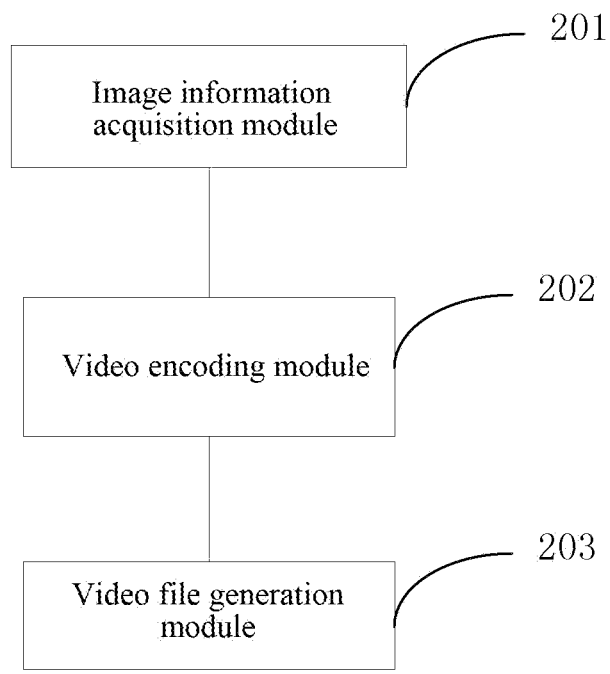
FIG. 2 illustrates a structural schematic diagram of a video recording device provided by embodiment 2 of the present document.

On the basis of the above-mentioned method, the embodiment of the present document further provides a video recording device. Please continue to refer to FIG. 2, the device includes the following modules.

An image information acquisition module 201 is configured to, based on a video recording start command of a user and an interval preset by the user, capture image data at intervals.

A video encoding module 202 is configured to perform an encoding processing on the image data captured by the image information acquisition module 201 at intervals.

A video file generation module 203 is configured to, based on a video recording end command of the user, use the image data, which are obtained after the video encoding module 202 performs the encoding processing, to generate a video file in accordance with a video file format set by the user.

A source of the image data may be a camera, self-defined bitmaps, a screen or textures in an OpenGL drawing system.

Alternatively, the video recording device may further include a parameter setting module configured to set an interval for video recording. In the actual application, the parameter setting module may provide the user with an operation interface at a terminal for the user to set the interval for video recording.

Alternatively, in order to improve the interest in shooting of the user, the video recording device may further include an image special effect processing module configured to perform a special effect processing on the image data captured by the image information acquisition module 201 at intervals, and sent the image data obtained after special effect processing to the video encoding module 202 to perform the encoding processing. Herein, the special effect processing includes one or more of the following contents: basic effect processing, filter effect and special scenario effect.

In order to guarantee that the user can record sounds at the same time when a video is recorded, the video recording device may further include:

an audio acquisition module configured to control to turn on an audio device and receive audio data; and an audio encoding module configured to perform an encoding processing on the audio data.

When the audio data include self-defined audio files, the audio acquisition module may be configured to receive or acquire audio data, and the audio encoding module may be configured to perform the encoding processing on the audio data.

Alternatively, the video recording device may further include: an audio special effect processing module configured to perform a special effect processing on the received audio data. Herein the special effect processing includes one or more of the following contents: special effect recording, mixing, voice changing, tone changing and speed changing.

In the actual application, the image information acquisition module 201 is a camera of a mobile terminal.

Video encoding includes but not limited to common video encodings such as MPEG-4, H264, H263 and VP8 and so on.

The video file format includes but not limited to mp4, 3gp, avi, rmvb, etc.

It needs to be exemplarily stated that the procedure that the video encoding module 202 repetitively performs the capturing and encoding processing is as follows. Supposing that the interval is set to be 1 second, the video encoding module 202 captures a preview image shot at a 1st second for one time, and performs an encoding processing on the captured preview image, and then captures a preview image shot at a 2nd second, and performs the encoding processing on the preview image captured at the 2nd second, and repetitively performs the operations in such a way until a video recording end command of the user is received. The video encoding module 202 sends the image data, which are captured at intervals and obtained after encoding, to the video file generation module 203 to generate a video file.

In addition, in order to save a storage space of the terminal device, the video encoding module 202 does not store image data which are not captured while capturing the preview images at intervals, in order to save the storage space.

In the video recording device provided by the embodiment, the image data are captured at intervals, and the encoding processing is performed by the video encoding module, and then by using the image data obtained after encoding processing, the video file is generated by the video file generation module. By the above operations, the function of recording a video at intervals at the mobile terminal is realized. The image special effect processing module performs the special effect processing on the image data captured at intervals. The audio acquisition module, the audio encoding module and the audio special effect processing module realize the functions of recording audio and performing the special effect processing on audio while the video is recorded. Therefore, the interest and practicability in recording the video by the user using the mobile terminal are greatly improved.

Embodiment 3

Figure 3:
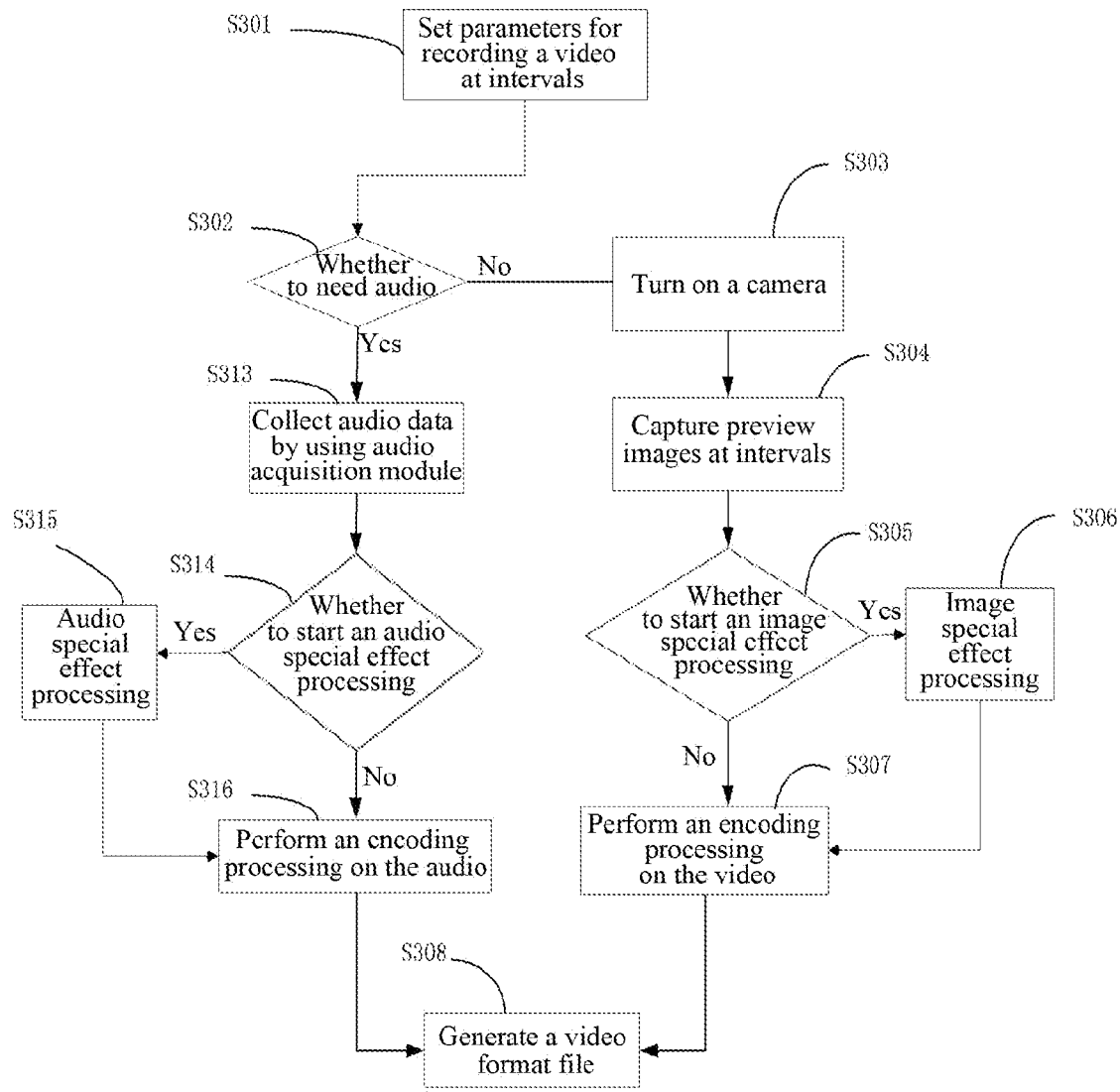
FIG. 3 illustrates a flowchart of a video recording method provided by embodiment 3 of the present document.

Please continue to refer to FIG. 3, which illustrates a video recording method provided by another embodiment of the present document. The procedure of the method includes the following steps.

In step S301, a user sets parameters for recording a video at intervals.

The user sets related parameters for recording the video at intervals through an operation interface. The related parameters include but not limited to: an interval for video recording, an interval mode (manual interval mode or automatic interval mode), whether to start an image special effect processing, whether to add audio, a source of audio, whether to start an audio special effect processing, etc.

For the interval mode, the automatic interval mode refers to capturing image data according to the interval, and the manual interval mode refers to providing the operation interface for the user to click to trigger image data capturing.

In step S302, according to the parameters for recording the video at intervals set by the user in step S301, whether audio needs to be added is judged. If no, step S303 to step S307 are performed. If yes, step S313 to step S316 are performed and step S303 to step S307 are performed at the same time.

When the audio needs to be recorded at the same time when the user records the video, by setting the related parameters, the function of recording the audio is started while the video is recorded.

In step S303, based on a video recording start command of the user, a camera is turned on (i.e., an image data information module is started).

The turned-on camera includes a front camera and/or a rear camera. The function of simultaneously turning on a plurality of cameras is supported. Image data captured by the plurality of cameras are synthesized according to a certain rule.

For example, under the situation that two cameras are simultaneously used, the image data captured by the rear camera are used as a background, and the image data captured by the front camera are synthesized in one area of the background, and the area may be confirmed by the user through clicking. The user may also change the area by dragging. Similarly, the image data captured by the front camera may also be used as the background, and the image data captured by the rear camera are synthesized in one area of the background.

In step S304, according to the interval mode and the interval set by the user in step S301, image data are captured at intervals.

In the embodiment, the automatic interval mode is adopted. The interval is set to be 1 second. Real-time image data are captured at the intervals of 1S.

In order to save a storage space of a mobile terminal, image data, which are not captured, are not stored in any form while encoding processing is performed on the image data captured at intervals, in order to save the storage space of the terminal.

In step S305, according to the related parameters set by the user in step S301, whether an image special effect processing needs to be performed is judged. If yes, step S306 is performed. If no, step S307 is performed.

In step S306, the special effect processing is performed on the image data captured at intervals.

Contents of the special effect processing include but not limited to the following processing and combinations thereof:

basic effect processing, including noise reduction, brightness, chromaticity, etc.;

filter effect, including sketch, negative film, black and white, etc.;

special scenario effect, including common weather, starry sky, etc.

In step S307, an encoding processing is performed on the image data obtained after special effect processing.

The operations of capturing the image data and performing an encoding processing in step S303 to step S307 are repetitively performed according to the interval. As described above, supposing that the interval is set to be 1 second, image data shot at a 1st second is captured for one time, and encoding processing is performed on the captured image data. Then image data shot at a 2nd second is captured, and encoding processing is performed on the image data captured at the 2nd second. The operations are repetitively performed in such a way until a video recording end command of the user is received.

The following is a procedure of recording audio while recording images when the video is recorded and the audio is added at the same time.

In step S313, an audio device is turned on to receive audio data.

Sources of audio mainly include two, i.e., a microphone and a self-defined audio file.

When the source of audio is the self-defined audio file, firstly the audio file is decoded to obtain original audio data.

In step S314, according to the related parameters set by the user in step S301, whether special effect processing needs to be performed is judged. If yes, step S315 is performed. If no, step S316 is performed.

In step S315, a special effect processing is performed on the audio data.

The contents of the special effect processing include but not limited to one or more of the following processing: special effect recording, mixing, voice changing, tone changing and speed changing.

In step S316, encoding processing is performed on the audio data.

The procedure of recording the audio from step S313 to step S316 and the procedure of recording the images from step S303 to step S307 are performed at the same time and there is no sequence in the procedures.

In step S308, based on a video recording end command of the user, by using the data obtained after encoding processing, a video file is generated in accordance with the video file format set by the user.

When the video recording end command of the user is received, by using the data including the video data and/or audio data obtained after encoding processing, a corresponding video file is generated in accordance with the video file format set by user in step S301.

The video file format includes but not limited to mp4, 3gp, avi, rmbv, etc.

In the video recording method provided by the embodiment, the image data are captured at intervals, and the encoding processing is performed, and then the video file is generated by using the image data obtained after encoding processing. By the above operations, the function of recording a video at intervals at the mobile terminal is realized. Moreover, the special effect processing is performed on the image data captured at intervals, and audio recording is added and the special effect processing is performed on the audio while the video is recorded. Therefore, the video recording diversity and entertainment of the mobile device are extended, and the user experience is greatly improved.

Embodiment 4

Figure 4:
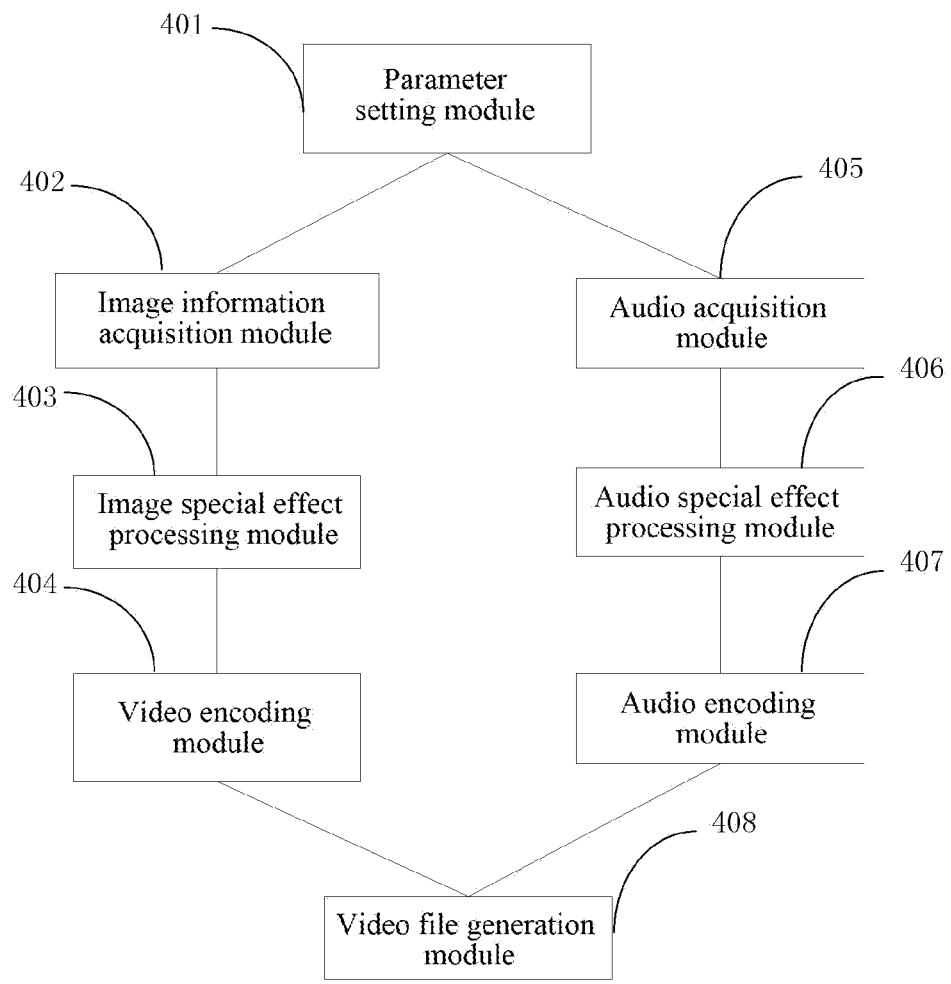
FIG. 4 illustrates a structural schematic diagram of a video recording device provided by embodiment 4 of the present document.

On the basis of the above-mentioned method, the embodiment of the present document further provides a video recording device. Please continuously refer to FIG. 4, the device includes the following modules.

A parameter setting module 401 is configured to set related parameters for video recording.

The related parameters include but not limited to: an interval for video recording, an interval mode (manual interval mode or automatic interval mode), whether to start an image special effect processing, whether to add audio, a source of audio, whether to start an audio special effect processing, etc. For the interval mode, the automatic interval mode refers to capturing image data according to the interval, and the manual interval mode refers to providing an operation interface for the user to click to trigger image data capturing.

An image information acquisition module 402 is configured to, based on a video recording start command of a user and an interval preset by the user, capture image data at intervals.

An image special effect processing module 403 is configured to, according to a special effect processing mode set by the parameter setting module 401, perform a special effect processing on the image data captured by the image information acquisition module 402 at intervals.

The image data may be images shot by a camera, or self-defined bitmaps, or images on a screen or textures in an OpenGL drawing system.

The contents of special effect processing include but not limited to one or more of the following: basic effect processing, filter effect and special scenario effect.

A video encoding module 404 is configured to perform an encoding processing on the image data obtained after the image special effect processing module 403 performs the special effect processing.

In order to save a storage space of the mobile terminal, image data which are not captured are not stored while the encoding processing is performed on the image data captured at intervals.

An audio acquisition module 405 is configured to control to turn on an audio device and receive audio data.

An audio special effect processing module 406 is configured to, according to the related parameters set by the parameter setting module 401, perform a special effect processing on the audio data received by the audio acquisition module 405.

The contents of special effect processing include but not limited to one or more of the following: special effect recording, mixing, voice changing, tone changing and speed changing.

An audio encoding module 407 is configured to perform an encoding processing on the audio data obtained after the audio special effect processing module 406 performs the special effect processing.

A video file generation module 408 is configured to, based on a video recording end command of the user, use the image data, which are obtained after the video encoding module 404 performs the encoding processing, and the audio data, which are obtained after the audio encoding module 407 performs the encoding processing, to generate a video file in accordance with the video file format set by the parameter setting module 401.

In the embodiment, the image data are captured at intervals, and the encoding processing is performed, and then the video file is generated by using the image data obtained after encoding processing. By the above operations, the function of recording a video at intervals at the mobile terminal is realized. The special effect processing is performed on the image data captured at intervals. Audio recording is added and the special effect processing is performed on the audio while the video is recorded. Therefore, the video recording diversity and entertainment of the mobile device are extended, and the user experience is greatly improved.

Embodiment 5

Figure 5:
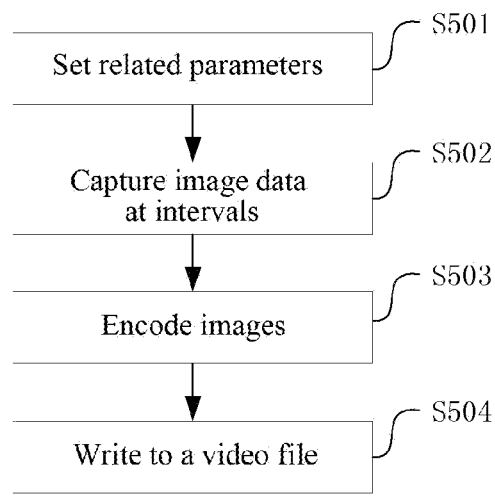
FIG. 5 illustrates a flowchart of a video recording method provided by embodiment 5 of the present document.

Please refer to FIG. 5, which illustrates a video recording method provided by another embodiment of the present document. In the embodiment, description is made by taking that a video is only recorded and special effect processing is not performed as an example. Operations of recording audio and/or performing special effect processing on the video may be implemented in combination with the foresaid embodiments and are not repetitively described here. In the embodiment, the process of the method includes the following steps.

In step S501, a user sets parameters for recording a video at intervals.

In addition to the parameters in the foresaid embodiments, the parameters may further include a video image PTS internal.

In step S502, based on a video recording start command of the user, a camera is turned on, and according to the set interval mode and the interval, image data are captured at intervals.

In step S503, general video image encoding processing is performed on the captured image data.

Encoding processing of the image data is completed by an image encoding module. Before encoding processing, firstly whether the image encoding module is initialized may be checked. If no, the image encoding module is initialized, for example, general information including image resolution, image update rate FPS and encoding format and so on is set. In addition, a buffer for receiving the image data is also applied, and the image encoding module performs general video image encoding processing after receiving the captured image data.

In step S504, the data obtained after encoding processing, PTS and other data needed for packing are written to a file to generate a video file.

According to the method provided by the embodiment, by additionally setting the PTS, the interest in video recording can be improved. For example, if the PTS is set to be an interval of 200 milliseconds for each image, a fast-forward effect is achieved.

Figure 6:
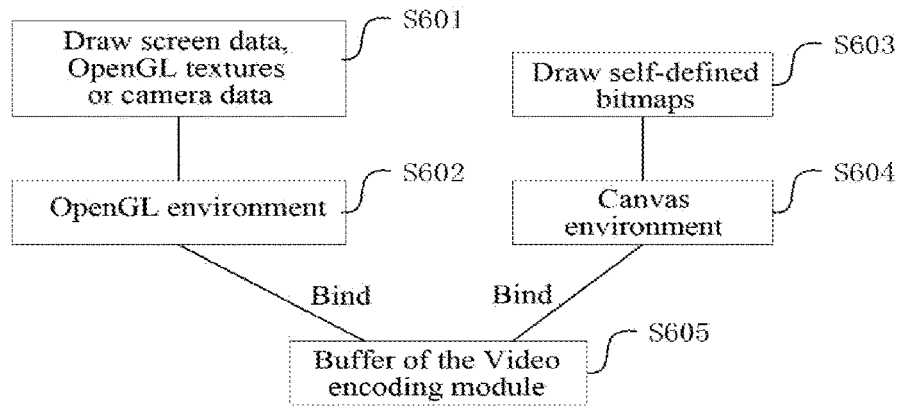
FIG. 6 illustrates a flowchart of outputting an image to an image encoding module in embodiment 5 of the present document.

In the embodiment, a procedure of outputting images to the image encoding module, as illustrated in FIG. 6, includes the following steps.

In step 601, an OpenGL environment is used for drawing data including one of the following three: screen data, OpenGL Textures and camera data.

In step 602, the OpenGL environment is bound to the buffer in the image encoding module and a connection is established therebetween.

After binding, the data drawn in step 601 may be directly output to the buffer.

In step 603, a Canvas environment is used for drawing a self-defined bitmap.

In step 604, the Canvas environment is bound to the buffer in the image encoding module and a connected is established therebetween.

After binding, the self-defined bitmap drawn in step 603 may be directly stored in the buffer.

In step 605, the buffer created in the video encoding module is used for receiving related image data.

Through the process, it can be seen that different image data may be transmitted to the buffer of the video encoding module.

Embodiment 6

Figure 7:
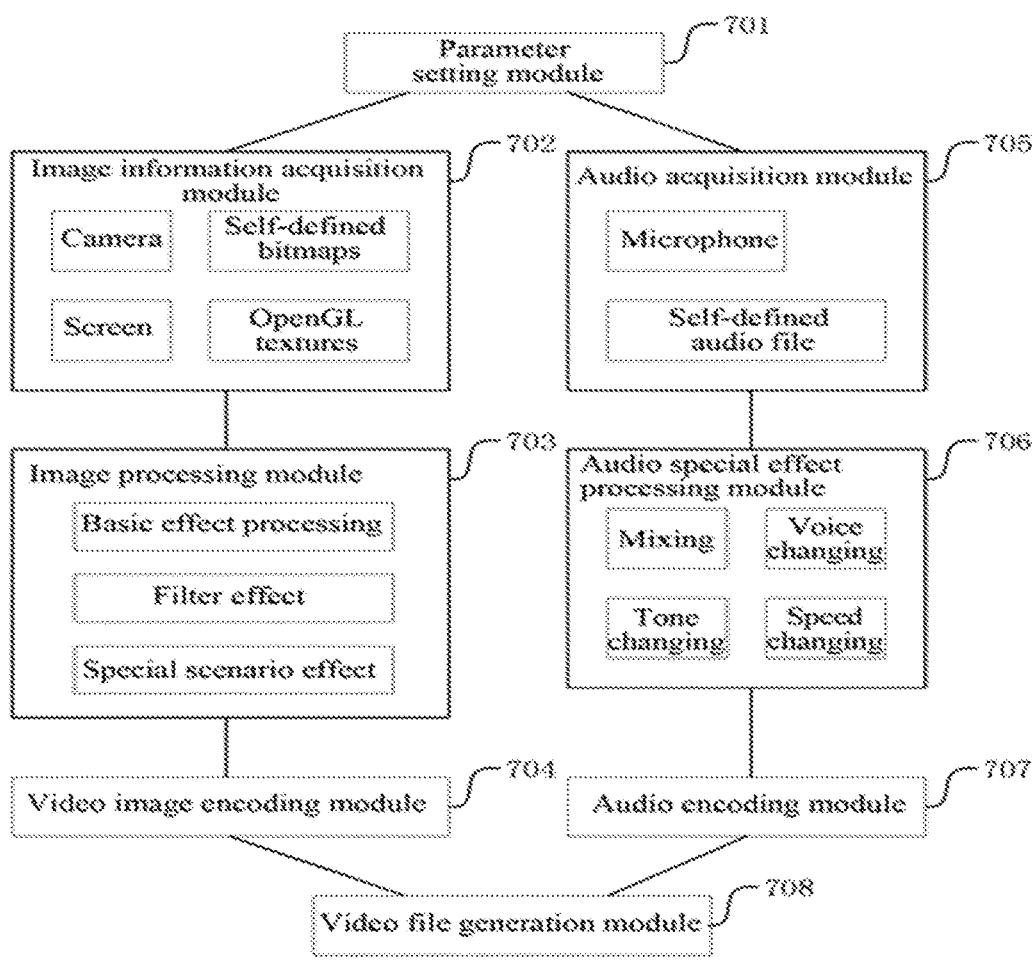
FIG. 7 illustrates a structural schematic diagram of a video recording device provided by embodiment 6 of the present document.

On the basis of the above-mentioned method, the embodiment of the present document further provides a video recording device. Please continue to refer to FIG. 7, the device includes the following modules.

A parameter setting module 701 is configured to set related parameters for video recording.

The related parameters include but not limited to: an interval for video recording, an interval mode (manual interval mode or automatic interval mode), whether to start image special effect processing, whether to add audio, a source of audio, whether to start audio special effect processing, PTS, etc. For the interval mode, the automatic interval mode refers to capturing image data according to the interval, and the manual interval mode refers to providing an operation interface for the user to click to trigger image data capturing.

An image information acquisition module 702 is configured to, based on a video recording start command of a user and an interval preset by the user, capture image data at intervals.

The image data captured by the image information acquisition module 702, for example, may be camera data (at the moment the image information acquisition module 702 is a camera), or screen data, or self-defined bitmaps, or OpenGL textures.

An image special effect processing module 703 is configured to, according to a special effect processing mode set by the parameter setting module 701, perform a special effect processing on the image data captured by the image information acquisition module 702 at intervals.

The contents of special effect processing include but not limited to one or more of the following: basic effect processing, filter effect and special scenario effect.

A video encoding module 704 is configured to perform an encoding processing on the image data obtained after the image special effect processing module 703 performs the special effect processing.

In order to save a storage space of the mobile terminal, image data which are not captured are not stored while encoding processing is performed on the image data captured at intervals.

An audio acquisition module 705 is configured to receive audio data.

The audio data received by the audio acquisition module 705, for example, may be data received by a microphone (at the moment the audio acquisition module 705 is the microphone), or self-defined audio files.

An audio special effect processing module 706 is configured to, according to the related parameters set by the parameter setting module 701, perform a special effect processing on the audio data received by the audio acquisition module 705.

The contents of special effect processing include but not limited to one or more of the following: special effect sound recording, sound mixing, voice changing, tone changing and speed changing.

An audio encoding module 707 is configured to perform an encoding processing on the audio data obtained after the audio special effect processing module 706 performs the special effect processing.

A video file generation module 708 is configured to, based on a video recording end command of the user, use the image data, which are obtained after the video encoding module 704 performs encoding processing, and the audio data which are obtained after the audio encoding module 707 performs encoding processing, to generate a video file in accordance with the video file format, the PTS and the like set by the parameter setting module 701.

Figure 8:
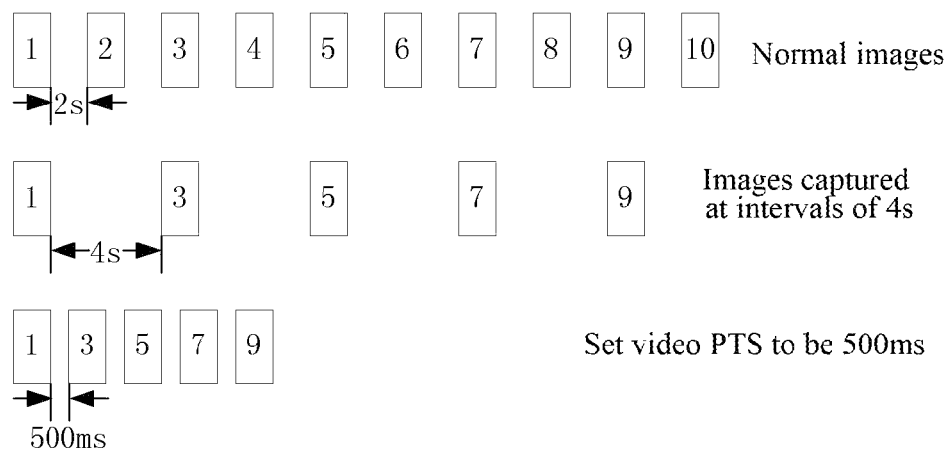
FIG. 8 illustrates a comparison diagram of intervals of original data, captured data and written data in embodiment 6 of the present document.

It needs to be exemplarily stated that the processing procedure of the parameter setting module 701 and the video encoding module 702 is as follows. Supposing that the capturing interval is set to be 4 seconds and the video PTS is 500 milliseconds, the image information acquisition module 702 captures image data at 0 second for one time, then captures image data at a 4th second, and repetitively performs the operations in such a way until a video recording end command of the user is received. The data, which are received by the video file generation module 708 from the video encoding module 704, are written to a video file according to the PTS of 500 milliseconds for each picture set by the parameter setting module 701. In the procedure, the interval of the images is presented as illustrated in FIG. 8. By capturing the image data at intervals and setting the image PTS interval in the video file, recording the video at intervals is implemented.

In the embodiment, the image data are captured at intervals, the encoding processing is performed, and then the video file is generated by using the image data obtained after encoding processing. By the above operations, the function of recording a video at intervals at the mobile terminal is realized. The special effect processing is performed on the image data captured at intervals. Audio recording is added and the special effect processing is performed on the audio while the video is recorded. The video file is packed according to the set PTS while the video file is generated. Therefore, the video recording diversity and entertainment of the mobile device are extended, and the user experience is greatly improved.

It needs to be stated that the technical features in the foresaid method embodiments are correspondingly applicable in the device embodiments, and thus are not repetitively described here.

In conclusion, according to the video recording method and device provided by the embodiments of the present document, the image data are captured at intervals, and the encoding processing is performed, and then the video file is generated by using the image data obtained after encoding processing. By the above operations, the function of recording a video at intervals at the mobile terminal is realized. The special effect processing is performed on the image data captured at intervals. Audio recording is added and the special effect processing is performed on the audio while the video is recorded. Therefore, the video recording diversity and entertainment of the mobile device are extended, and the user experience is greatly improved.

One ordinary skilled in the art can understand that all or partial steps in the above-mentioned methods may be completed by relevant hardware instructed by a program. The program may be stored in a computer readable storage medium such as a read-only memory, a magnetic disc or a compact disc, etc. Alternatively, all or partial steps in the above-mentioned embodiments may also be implemented by using one or more integrated circuits. Correspondingly, each module/unit in the above-mentioned embodiments may be implemented by means of hardware and may also be implemented by means of a software function module. The embodiments of the present document are not limited to combinations of hardware and software in any specific form.

INDUSTRIAL APPLICABILITY

The image data are captured at intervals, and the encoding processing is performed, and then the video file is generated by using the image data obtained after encoding processing. By the above operations, the function of recording a video at intervals at the mobile terminal is realized. The special effect processing is performed on the image data captured at intervals. Audio recording is added and the special effect processing is performed on the audio while the video is recorded. Therefore, the diversity and entertainment of the video recording at the mobile terminal are extended. The user experience is greatly improved.

What we claim is:

1. A video recording method, comprising the following steps:

based on a video recording start command of a user, a video recording device simultaneously starting a first camera and a second camera on a terminal, wherein the first camera is located on a front side of the terminal, the second camera is located on a rear side of the terminal; and based on an interval preset by the user, repetitively performing the following operations: the video recording device capturing image data at intervals through the first camera and the second camera and performing an encoding processing on the image data captured at intervals; wherein, the image data captured by the second camera are used as a background, the image data captured by the first camera are synthesized in one area of the background; or the image data captured by the first camera are used as a background, the image data captured by the second camera are synthesized in one area of the background;

based on a video recording end command of the user, the video recording device using the image data obtained after encoding processing to generate a video file in accordance with a video file format set by the user;

wherein the image data comprise camera data, or self-defined bitmaps, or screen data, or textures in an OpenGL drawing system; an OpenGL environment used for drawing the camera data, the screen data, or the textures and a Canvas environment used for drawing the self-defined bitmap are bound to a buffer in the video recording device, and the camera data, the screen data, or the textures drawn in the OpenGL environment is directly output to the buffer in the video recording device, and the self-defined bitmap drawn in the Canvas environment is directly stored in the buffer in the video recording device.

2. The method according to claim 1, wherein, before the video recording device performing an encoding processing on the image data captured at intervals, the method further comprises:
the video recording device performing a special effect processing on the image data captured at intervals, wherein the special effect processing comprises one or more of the following contents: basic effect processing, filter effect and special scenario effect.

3. The method according to claim 2, wherein the method further comprises: the video recording device providing the user with an operation interface configured to set an interval for video recording.

4. The method according to claim 1, wherein, while the video recording device capturing image data at intervals and performing an encoding processing on the image data captured at intervals, the method further comprises:
the video recording device controlling to turn on an audio device and receive audio data; and
the video recording device performing an encoding processing on the audio data.

5. The method according to claim 4, wherein, before the video recording device performing the encoding processing on the audio data, the method further comprises:
the video recording device performing a special effect processing on the received audio data, wherein the special effect processing comprises one or more of the following contents: special effect recording, mixing, voice changing, tone changing and speed changing.

6. The method according to claim 5, wherein a mode of generating the video file comprises:
based on the video recording end command of the user, the video recording device using the image data obtained after encoding processing and the audio data obtained after encoding processing to generate the video file in accordance with the video file format set by the user.

7. The method according to claim 5, wherein the method further comprises: the video recording device providing the user with an operation interface configured to set an interval for video recording.

8. The method according to claim 4, wherein a mode of generating the video file comprises:
based on the video recording end command of the user, the video recording device using the image data obtained after encoding processing and the audio data obtained after encoding processing to generate the video file in accordance with the video file format set by the user.

9. The method according to claim 4, wherein the method further comprises: the video recording device providing the user with an operation interface configured to set an interval for video recording.

10. The method according to claim 1, wherein the method further comprises: the video recording device providing the user with an operation interface configured to set an interval for video recording.

11. The method according to claim 1, wherein the video recording device using the image data obtained after encoding processing to generate a video file in accordance with a video file format set by the user comprises:
the video recording device using the image data obtained after encoding processing to generate the video file in accordance with the video file format set by the user and a set Presentation Time Stamp, PTS.

12. A non-transitory computer-readable storage medium storing program instructions, wherein, when being executed, the program instructions can implement the method according to claim 1.

13. A video recording device, comprising: hardware configured to execute instructions stored in a non-transitory computer readable medium to execute steps in modules:
an image information acquisition module configured to, based on a video recording start command of a user and an interval preset by the user, capture image data at intervals; wherein when capturing the image data, two cameras on a terminal are started, a first camera is located on a front side of the terminal, a second camera is located on a rear side of the terminal; the image data captured by the image information acquisition module from the second camera are used as a background, the image data captured by the image information acquisition module from the first camera are synthesized in one area of the background; or the image data captured by the image information acquisition module from the first camera are used as a background, the image data captured by the image information acquisition module from the second camera are synthesized in one area of the background;
a video encoding module configured to perform an encoding processing on the image data captured by the image information acquisition module at intervals; and
a video file generation module configured to, based on a video recording end command of the user, use the image data, which are obtained after the video encoding module performs the encoding processing, to generate a video file in accordance with a video file format set by the user;
wherein the image data comprise camera data, or self-defined bitmaps, or screen data, or textures in an OpenGL drawing system; wherein the video recording device further comprises an image encoding module, an OpenGL environment used for drawing the camera data, the screen data, or the textures and a Canvas environment used for drawing the self-defined bitmap are bound to a buffer in the image encoding module, and the camera data, the screen data, or the textures drawn in the OpenGL environment is directly output to the buffer in the image encoding module, and the self-defined bitmap drawn in the Canvas environment is directly stored in the buffer in the image encoding module, and a buffer of the video encoding module is configured to receive the image data from the image encoding module.

14. The device according to claim 13, wherein the hardware is further configured to, when executing the instructions stored in the non-transitory computer readable medium, execute steps in a following module:
a parameter setting module configured to set an interval for video recording.

15. The device according to claim 14, wherein,
the parameter setting module is further configured to set a Presentation Time Stamp, PTS, when the video file is generated; and
the video file generation module is configured to use the image data obtained after encoding processing to generate the video file in accordance with the video file format set by the parameter setting module and the PTS when the video file is generated.

16. The device according to claim 13, wherein the hardware is further configured to, when executing the instructions stored in the non-transitory computer readable medium, execute steps in a following module:
an image special effect processing module configured to perform a special effect processing on the image data captured by the image information acquisition module at intervals, wherein the special effect processing comprises one or more of the following contents: basic effect processing, filter effect and special scenario effect.

17. The device according to claim 13, wherein the hardware is further configured to, when executing the instructions stored in the non-transitory computer readable medium, execute steps in the following modules:
an audio acquisition module configured to control to turn on an audio device and receive audio data; and
an audio encoding module configured to perform an encoding processing on the audio data.

18. The device according to claim 17, wherein the hardware is further configured to, when executing the instructions stored in the non-transitory computer readable medium, execute steps in the following module:
an audio special effect processing module configured to perform a special effect processing on the received audio data, wherein the special effect processing comprises one or more of the following contents: special effect recording, mixing, voice changing, tone changing and speed changing.

* * * * *